(12) United States Patent
Miyoshi

(10) Patent No.: US 8,160,167 B2
(45) Date of Patent: *Apr. 17, 2012

(54) RADIO TRANSMITTING APPARATUS, RADIO RECEIVING APPARATUS AND METHOD THEREFOR

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/797,378

(22) Filed: Jun. 9, 2010

(65) Prior Publication Data

US 2010/0246702 A1    Sep. 30, 2010

Related U.S. Application Data

(60) Continuation of application No. 12/061,599, filed on Apr. 2, 2008, now Pat. No. 7,760,813, which is a division of application No. 10/489,826, filed as application No. PCT/JP03/04743 on Apr. 15, 2003, now Pat. No. 7,372,909.

(30) Foreign Application Priority Data

Apr. 17, 2002 (JP) .................................. 2002-114870

(51) Int. Cl.
*H04K 1/10* (2006.01)
*H04L 27/28* (2006.01)

(52) U.S. Cl. ........ 375/260; 375/146; 375/229; 375/350; 375/342; 370/441; 370/329

(58) Field of Classification Search .................. 375/260, 375/146, 229, 350, 135, 295, 296; 370/441, 370/329

See application file for complete search history.

(56) References Cited

U.S. PATENT DOCUMENTS

| | | | |
|---|---|---|---|
| 5,243,629 A | 9/1993 | Wei | |
| 5,487,089 A | 1/1996 | Misaizu | |
| 5,828,650 A | 10/1998 | Malkamaki | |
| 6,226,337 B1 | 5/2001 | Klank | |
| 6,522,638 B1 * | 2/2003 | Haugli et al. | 370/329 |
| 7,012,949 B2 | 3/2006 | Uesugi | |
| 7,020,095 B2 | 3/2006 | Chini | |

(Continued)

FOREIGN PATENT DOCUMENTS

DE    43 30 672    3/1995

(Continued)

OTHER PUBLICATIONS

International Search Report mailed May 19, 2003, issued in corresponding International Application No. PCT/JP03/04743, filed Apr. 15, 2003, 3 pages.

(Continued)

*Primary Examiner* — Phuong Phu
(74) *Attorney, Agent, or Firm* — Dickinson Wright PLLC

(57) ABSTRACT

By assigning a plurality of subcarriers 31 to a data channel 33 and assigning fewer subcarriers 32 than the plurality of subcarriers 31 to a control channel 34 and, in addition, locating the control channel 34 at the center frequency fc of a frequency band used to transmit the data channel 33, on the radio receiving apparatus side, the frequencies of a local signal by which the received signal is multiplied share the same value, thereby speeding up the switching between the control channel and the data channel.

24 Claims, 13 Drawing Sheets

U.S. PATENT DOCUMENTS

| | | | |
|---|---|---|---|
| 7,372,909 B2 * | 5/2008 | Miyoshi | 375/260 |
| 2002/0154705 A1 | 10/2002 | Walton | |
| 2002/0159414 A1 | 10/2002 | Kanemoto | |
| 2002/0159426 A1 | 10/2002 | Kanemoto | |
| 2003/0224731 A1 | 12/2003 | Yamaura | |

FOREIGN PATENT DOCUMENTS

| | | |
|---|---|---|
| EP | 0 788 265 | 8/1997 |
| EP | 1 179 902 A1 | 2/2002 |
| JP | 05-218978 A | 8/1993 |
| JP | 05-300179 A | 11/1993 |
| JP | 2000-269918 | 9/2000 |
| JP | 2001-144722 A | 5/2001 |
| JP | 2001-156744 A | 6/2001 |
| JP | 2001-251264 A | 9/2001 |
| JP | 2001-274767 A | 10/2001 |
| JP | 2001-285927 A | 10/2001 |
| JP | 2003-249908 | 9/2003 |

OTHER PUBLICATIONS

Second Office Action, mailed Nov. 7, 2008, issued in corresponding International Application No. PCT/JP03/04743, filed Apr. 15, 2003, 5 pages.

Japanese Office Action dated Aug. 2, 2011.

M. Iizuka et al., "IEEE80211a—Junkyo Kousokumusen LAN Souchi no Kaihatsu", NTT Gijutsu Journal, Japan, Jun. 1, 2011, vol. 13, No. 6, pp. 83-87.

European Search Report dated Nov. 25, 2010.

* cited by examiner

RADIO TRANSMITTING APPARATUS, RADIO RECEIVING APPARATUS AND METHOD THEREFOR

CROSS-REFERENCES TO RELATED APPLICATIONS

This application is a continuation of application Ser. No. 12/061,599, filed Apr. 2, 2008, which is a division of application Ser. No. 10/489,826, filed Mar. 17, 2004, now U.S. Pat. No. 7,372,909, which is the National Stage of International Application No. PCT/JP03/04743, filed Apr. 15, 2003, which is based on Japanese Patent Application No. 2002-114870, filed Apr. 17, 2002, the entire disclosures of which are incorporated by reference herein.

BACKGROUND

1. Technical Field

The present invention relates to a radio transmitting apparatus and a radio receiving apparatus used in a digital radio communications system, and a method for them.

2. Background Art

In a typical digital radio communications system using a multicarrier communication scheme, for when communicating using a data channel for transmitting voice data and/or image data and a control channel for controlling a communication station at another end and a communication state, a method where a small number of subcarriers are assigned to the control channel while multiple subcarriers are assigned to the data channel in order to minimize power consumption in a mobile station has been proposed (Laid-Open Japanese Patent Publication No. 2001-274767; Laid-Open Japanese Patent Publication No. 2001-285927).

In this method, a receiving apparatus performs A/D conversion on the control channel at a relatively low sampling rate in order to receive the control channel of narrowband comprising a small number of subcarriers, and in response to having received the control channel, the sampling rate of A/D conversion for the received signal is taken to be high to prepare for receiving the data channel of wideband comprising multiple subcarriers.

However, in this conventional receiving apparatus, because the center frequency of a data channel comprising a plurality of subcarriers 2 is different from the center frequency of a control channel 6 as shown in FIG. 1, the frequency of a local signal for down converting the subcarriers of the control channel 6 needs to be changed in order to switch from the receiving of the control channel 6 to that of the data channel 4 as shown in FIG. 2.

Here, the local signal is a signal whose frequency is set to the center frequency of a transmit frequency band on the transmitter side and by which a D/A converted, transmitting signal is multiplied to up convert the transmitting signal. On the receiver side, the signal received via an antenna is multiplied by a local signal to down convert the received signal.

Therefore, when the center frequency of the control channel 6 is different from the center frequency of the subcarriers of the data channel 4, the local signal's frequency needs to be changed to the center frequency of the data channel 4 after receiving the control channel 6, in order to receive the data channel 4. Until a PLL (Phased Locked Loop) circuit generating the local signal becomes stable in changing the local signal's frequency, it is difficult to switch from the receiving of the control channel 6 to that of the data channel 4, thus having prevented the speeding up of switching between the control channel 6 and the data channel 4.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of the present invention is to provide a radio transmitting apparatus and a radio receiving apparatus that can switch between the control channel and the data channel at high speed on the radio receiving apparatus side, and a method therefor.

In order to achieve the above object, according to the present invention, a plurality of subcarriers are assigned to a data channel, and fewer subcarriers than the plurality of subcarriers are assigned to a control channel and, in addition, the control channel is located at the center frequency of a frequency band used to transmit the data channel, so that, on the radio receiving apparatus side, the frequencies of a local signal by which the received signal is multiplied share the same value. Thus, switching between the control channel and the data channel can be speeded up.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present invention will be described in detail below with reference to the drawings.

Embodiment 1

Figure 3:
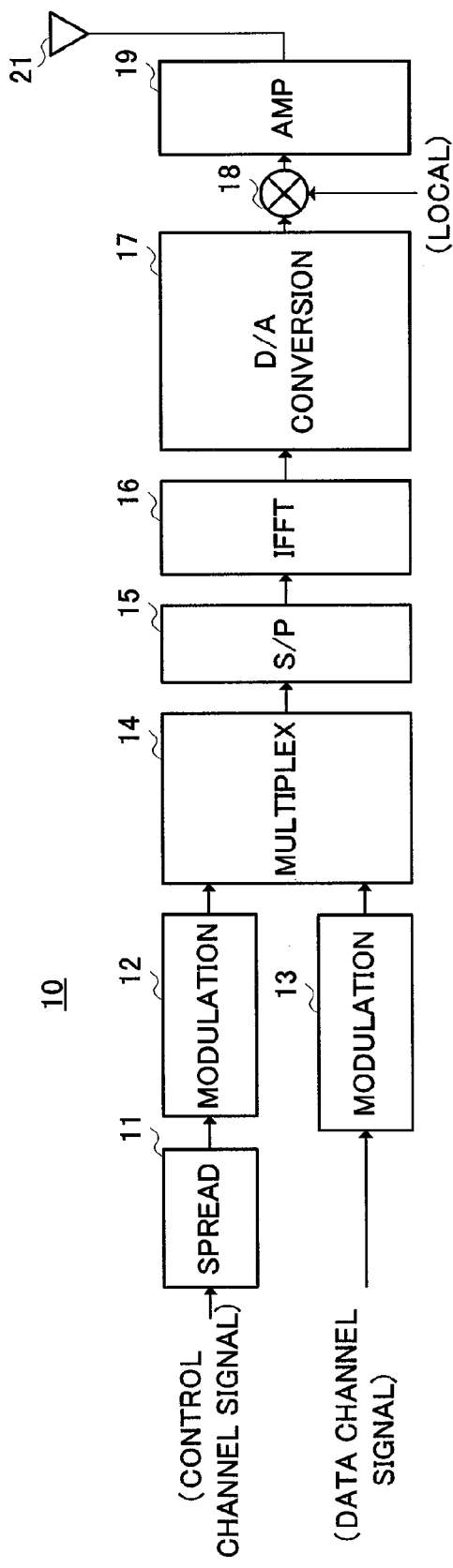
FIG. 3 is a block diagram showing the configuration of a radio transmitting apparatus according to embodiment 1 of the present invention.

FIG. 3 is a block diagram showing the configuration of a radio transmitting apparatus 10 according to embodiment 1 of the present invention. In FIG. 3, the radio transmitting apparatus 10 is provided in a base station apparatus or a mobile station apparatus, and is for multiplexing a control channel signal and a data channel signal to transmit. In this embodiment, a case will be described where a signal is transmitted using a bandwidth of 100 MHz in a frequency band with its center frequency being 5 GHz.

In the radio transmitting apparatus 10, a bandwidth of 1 MHz is used for the control channel, and a bandwidth of 99 MHz, which is not used for the control channel, is used for the data channel of the bandwidth of 100 MHz.

The control channel signal is spread in a spreading section 11 and modulated according to a predetermined modulation scheme in a modulation section 12, and then supplied to a multiplexing section 14. Furthermore, the data channel signal is modulated in a modulation section 13, and then supplied to the multiplexing section 14. The multiplexing section 14 multiplexes the control channel signal and the data channel signal such that the control channel signal is mapped to the center frequency of a transmit band with respect to the modulated control channel signal and data channel signal.

The output of the multiplexing section 14 is supplied to a serial parallel conversion section (S/P) 15 to be serial parallel converted, and then inverse-fast-Fourier transformed in an IFFT (Inverse Fast Fourier Transform) section 16. As a result of the inverse-fast-Fourier transforming, the bandwidth becomes 100 MHz.

The output of the IFFT section 16 is converted into an analog signal in a digital-analog (D/A) conversion section 17, and then multiplied by a local signal (carrier signal) in a multiply section 18. Because the frequency of the local signal is set at the center frequency (5 GHz) of the band in use for transmitting, a signal obtained by multiplying by the local signal in the multiply section 18 has been up-converted to the transmit band (5 GHz±50 MHz). After being amplified in an amplifier (AMP) 19, the signal is transmitted via an antenna 21.

Figure 4:
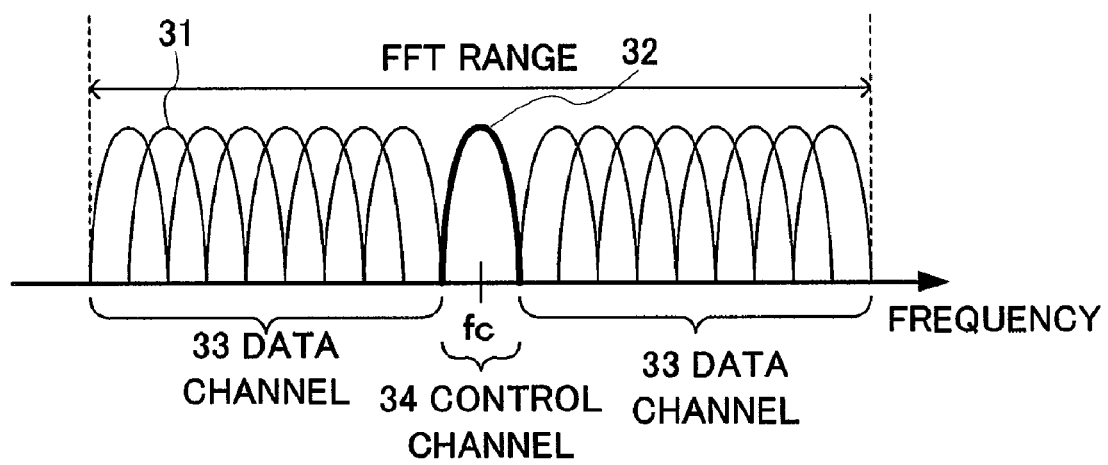
FIG. 4 is a view of a signal waveform showing a transmitted signal according to the embodiment 1.

A multicarrier signal generated in the radio transmitting apparatus 10 in this manner is so structured that, as shown in FIG. 4, the number of subcarriers 32 composing the control channel 34 is less than the number of subcarriers 31 composing the data channel 33, and is in a state where the control channel 34 is located at the center frequency fc of the transmit band (FFT range) of the data channel 33.

By locating the control channel 34 at the center frequency fc of the data channel 33 as described above, common local frequency can be used on a receiving apparatus side described below when down converting.

Figure 5:
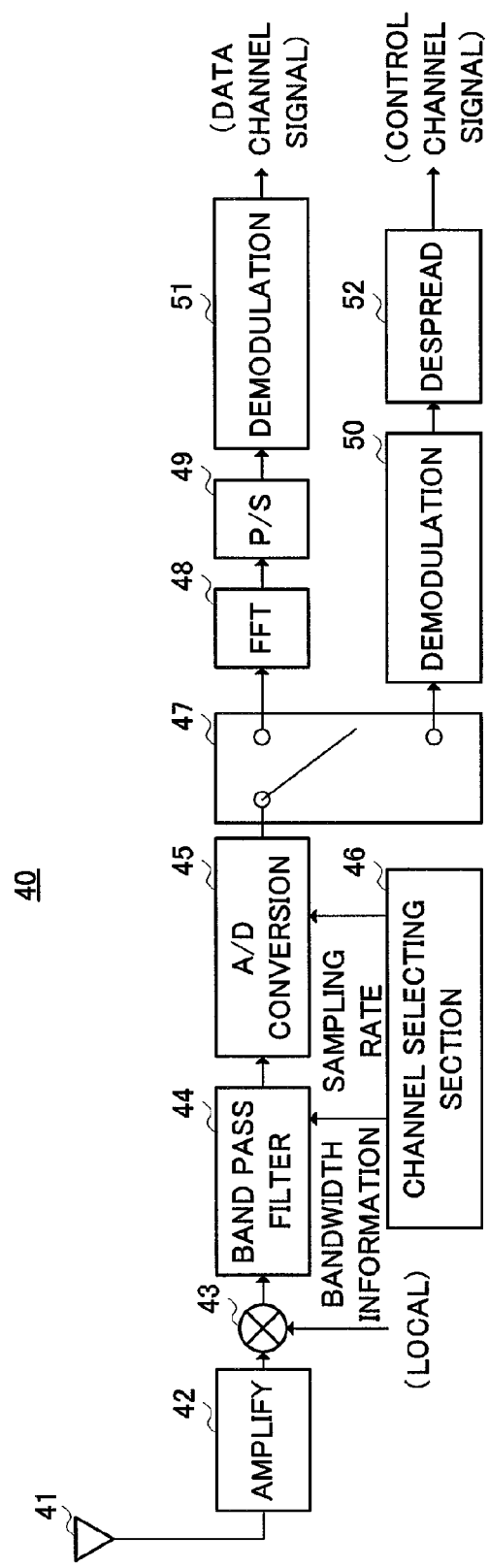
FIG. 5 is a block diagram showing the configuration of a radio receiving apparatus according to the embodiment 1 of the present invention.

FIG. 5 is a block diagram showing the configuration of a radio receiving apparatus 40 provided in a mobile station apparatus or a base station apparatus. In FIG. 5, the transmitted signal from the radio transmitting apparatus 10 received via an antenna 41 is amplified in an amplifier 42, and then supplied to a multiply section 43. The multiply section 43 performs mixing by multiplying the signal supplied from the amplifier 42 by a local signal set at 5 GHz, i.e., the signal's center frequency. As a result, the signal input into the multiply section 43 is down converted.

A channel selecting section 46 allows only the control channel 34 of the received signal to pass through by controlling a band-pass filter 44 to have the band of 1 MHz pass to match the control channel 34 of the received signal. In this case, the channel selecting section 46 controls an analog-digital (A/D) conversion section 45 to sample the control channel 34 at a sampling rate of 1 Msps to match the bandwidth of the control channel 34.

Moreover, the channel selecting section 46 allows the data channel 33 contained in the received signal to pass through by controlling the band-pass filter 44 to have the band of 100 MHz pass to match the data channel 33 of the received signal. In this case, the channel selecting section 46 controls the analog-digital (A/D) conversion section 45 to sample the data channel 33 at a sampling rate of 100 Msps to match the bandwidth of the data channel 33.

A switch section 47, when selecting the data channel 33, supplies the signal of the data channel 33 to an FFT (Fast Fourier Transform) section 48 by being switched to a first switch output port side. After being fast-Fourier transformed, the signal of the data channel 33 supplied to the FFT section 48 is supplied to a parallel-serial (P/S) section 49, and after being converted into a serial signal, is demodulated in a demodulation section 51.

On the other hand, the switch section 47, when selecting the control channel 34, supplies the signal of the control channel 34 to a demodulation section 50 by being switched to a second switch output port side. The signal of the control channel 34 demodulated in the demodulation section 50 is then despread in a despreading section 52.

In this manner, the multicarrier signal transmitted from the radio transmitting apparatus 10 (FIG. 3) is received by the radio receiving apparatus 40 (FIG. 5), and the control channel 34 located at the center frequency fc of transmit band (the data channel 33) and the data channel 33 are down converted with the common local frequency.

Figure 6:
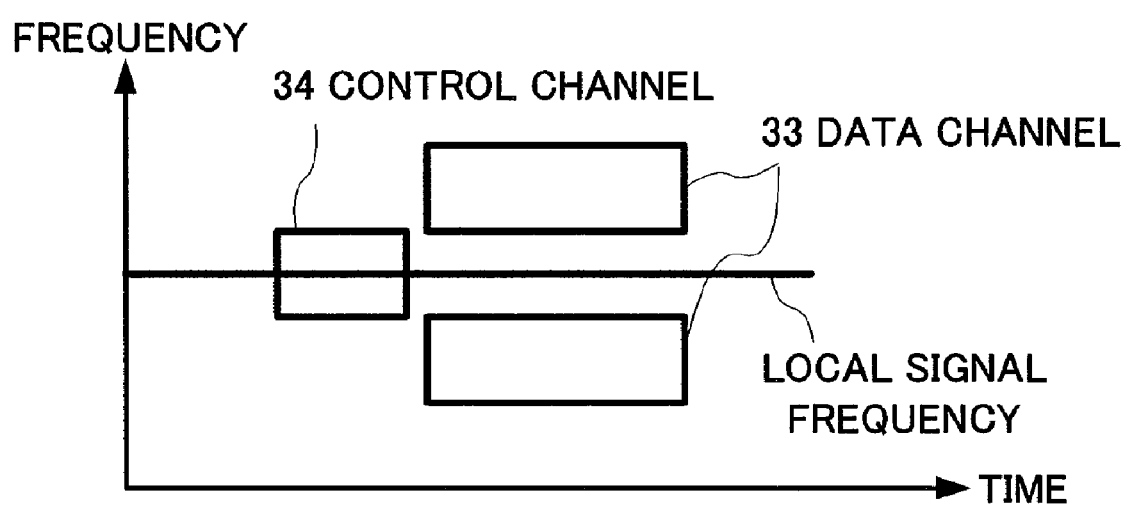
FIG. 6 is a schematic view for explaining an operation of the embodiment 1 of the present invention.

As described above, by down-converting the control channel 34 and the data channel 33 with the common local frequency, as shown in FIG. 6, the local frequency does not need to be changed when switching between the receiving of the control channel 34 and the receiving of the data channel 33. Since the local frequency does not need to be changed, switching from the control channel 34 to the data channel 33 in receiving can be speeded up. Moreover, by dealing with the control channel 34 and the data channel 33 by changing the sampling rate of one analog-digital conversion section 45, the circuit configuration can be further reduced compared with the case of providing respective analog digital conversion sections for the control channel 34 and the data channel 33.

Furthermore, because the radio transmitting apparatus 10 spreads the signal of the control channel 34 and then transmits a receiver can extract the signal for the receiver even when using the same frequency with a radio transmitting apparatus in the neighborhood.

Yet further, while an effect of DC (Direct Current) offset occurs on the center frequency of the transmit band, in the present embodiment the effect of DC offset can be removed by spreading the control channel 34 located at the center frequency, and by this means the data of the control channel 34 can be received with good quality in the radio receiving apparatus 40.

Moreover, by using only one subcarrier 32 as the control channel 34 in the radio transmitting apparatus 10 and the radio receiving apparatus 40, a filter can be designed for the radio receiving apparatus 40 without taking into account interference between subcarriers, thereby simplifying the circuit configuration of the filter.

Embodiment 2

Figure 7:
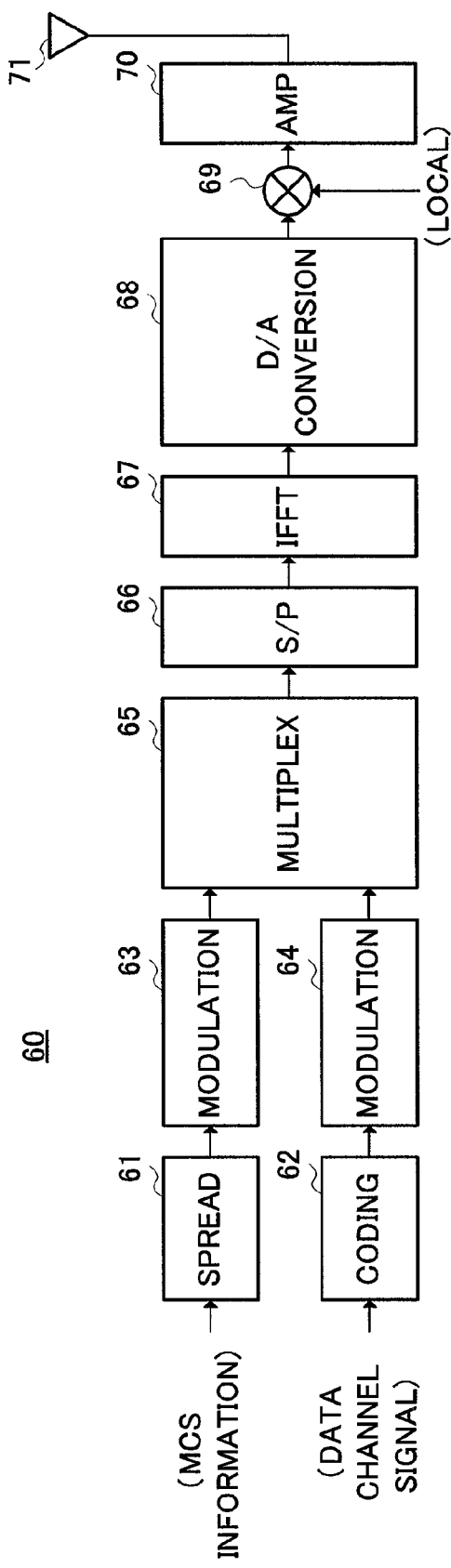
FIG. 7 is a block diagram showing the configuration of a radio transmitting apparatus according to embodiment 2 of the present invention.

FIG. 7 is a block diagram showing the configuration of a radio transmitting apparatus 60 according to embodiment 2 of the present invention. In FIG. 7, the radio transmitting apparatus 60 is provided in a base station apparatus or a mobile station apparatus, and is for multiplexing and transmitting a signal (MCS signal) notifying information denoting modulation and coding schemes in packet transmission (hereinafter called MCS (Modulation and Coding Schemes) information) as a control channel, with packet data. In this embodiment, a case will be described where a signal is transmitted using a bandwidth of 100 MHz in a frequency band with its center frequency being 5 GHz.

In the radio transmitting apparatus 60, a bandwidth of 1 MHz is used for the MCS signal, and a bandwidth of 99 MHz, which is not used for the transmission of the MCS signal, is used for the packet data of the bandwidth of 100 MHz.

The MCS signal is spread in a spreading section 61 and modulated according to a predetermined modulation scheme in a modulation section 63, and then supplied to a multiplexing section 65. Furthermore, at the same time, the data channel signal is encoded in an encoding section 62 and supplied as packet data to a modulation section 64. After being modulated in the modulation section 64, the packet data is supplied to the multiplexing section 64.

The multiplexing section 65 multiplexes the MCS signal and the packet data such that the MCS signal is mapped to the center frequency of a transmit band with respect to the modulated MCS signal and the packet data.

The output of the multiplexing section 65 is supplied to a serial-parallel conversion section (S/P) 66 to be serial-parallel converted, and then inverse-fast-Fourier transformed in an IFFT (Inverse Fast Fourier Transform) section 67. As a result of the inverse fast Fourier transforming, the bandwidth becomes 100 MHz.

The output of the IFFT section 67 is converted into an analog signal in a digital analog (D/A) conversion section 68, and then multiplied by a local signal (carrier signal) in a multiply section 69. Because the frequency of the local signal is set at the center frequency (5 GHz) of the band in use for transmitting, a signal obtained by multiplying by the local signal in the multiply section 69 has been up-converted to the transmit band (5 GHz±50 MHz). After being amplified in an amplifier (AMP) 70, the signal is transmitted via an antenna 71.

Figure 8A:
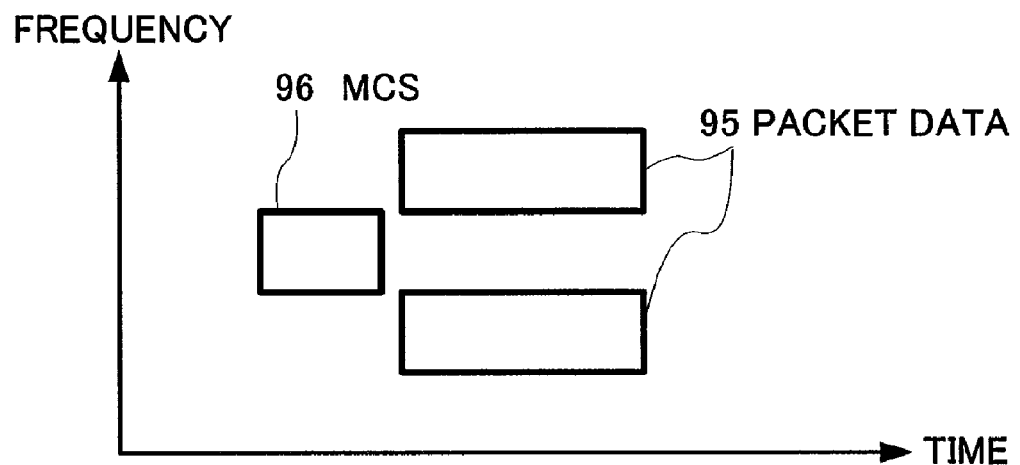
FIG. 8A is a schematic view for explaining an operation of the embodiment 2 of the present invention.

Of a multicarrier signal generated in the radio transmitting apparatus 60 in this manner, the packet data 95, in which the MCS signal 96, which is the control channel signal, is located at the center frequency, is transmitted subsequently to the MCS signal 96 as shown in FIG. 8A.

By locating the MCS signal 96 at the center frequency of the packet data 95 as above, a common local frequency 15 can be used on a receiving apparatus side described below when down converting.

Figure 9:
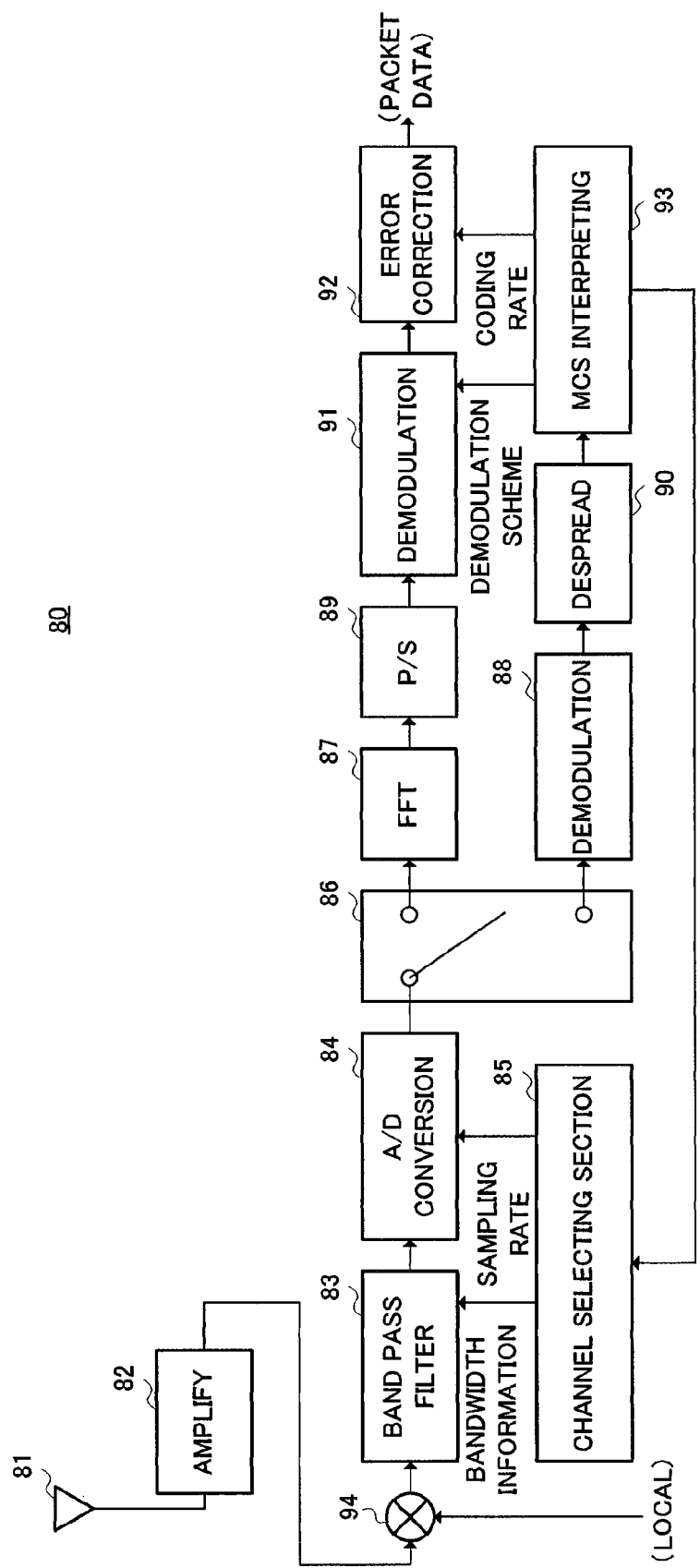
FIG. 9 is a block diagram showing the configuration of a radio receiving apparatus according to the embodiment 2 of the present invention.

FIG. 9 is a block diagram showing the configuration of a radio receiving apparatus 80 provided in a mobile station apparatus or a base station apparatus. In FIG. 9, the transmitted signal from the radio transmitting apparatus 60 received via an antenna 81 is amplified in an amplifier 82, and then supplied to a multiply section 94. The multiply section 94 performs mixing by multiplying the signal supplied from the amplifier 82 by a local signal set at 5 GHz, i.e., the signal's center frequency. As a result, the signal input into the multiply section 94 is down converted.

A channel selecting section 85, in a usual state, enables only the MCS signal 96 of the received signal to be received by controlling a band-pass filter 83 to have the band of 1 MHz pass to match the MCS signal 96 of the received signal, with monitoring the MCS signal. In this case, the channel selecting section 85 controls an analog-digital (A/D) conversion section 84 to sample the MCS signal 96 at a sampling rate of 1 Msps to match the bandwidth of the MCS signal 96.

Then, when the MCS signal 96 is received, the MCS signal 96 is supplied via a switch section 86 to a demodulation section 88. After being demodulated in this section, the MCS signal 96 is despread in a despreading section 90 and supplied to an MCS interpreting section 93. The MCS signal 96 includes information about whether packet data for the radio receiving apparatus 80 is transmitted in the next slot and information about its modulation scheme and coding rate. The MCS interpreting section 93 interprets this information contained in the MCS signal 96, and supplies information for controlling the bandwidth of the band-pass filter 83 to select packet data and information for controlling the sampling rate of the analog-digital conversion section 84 to select packet data to the channel selecting section 85, and at the same time, supplies information denoting the demodulation scheme read out from the MCS signal 96 to a demodulation section 91, which demodulates packet data, and also information denoting the coding rate read out from the MCS signal 96 to an error correction section 92. Thereby, it becomes possible that in response to incoming packet data, the band-pass filter 83 and the analog-digital conversion section 84 performs band-pass and conversion-into-digital processing, that the demodulation section 91 demodulates according to the specified scheme, and that the error correction section 92 performs error correction, controlling the coding rate specified by the MCS information.

For example, when packet data is expected to be received in the next slot from interpreting the MCS signal 96, by controlling the band-pass filter 83 to have the bandwidth of 100 MHz pass to match the packet data 95, the packet data 95 contained in the received signal is allowed to pass through. In this case, the channel selecting section 85 controls the analog-digital (A/D) conversion section 84 to sample the packet data 95 at a sampling rate of 100 Msps to match the bandwidth of the packet data 95.

Moreover, the switch section 86, when the received signal is the packet data 95, supplies this received signal to an FFT (Fast Fourier Transform) section 87 by switching its switch output ports according to a schedule to receive the packet data 95 interpreted in the MCS interpreting section 93. After being fast-Fourier transformed, the packet data 95 supplied to the FFT section 87 is supplied to a parallel-serial (P/S) section 89 and converted into a serial signal, and then demodulated in the demodulation section 91. For this demodulation, the demodulation scheme is determined based on information interpreted from the MCS signal 96.

Then, the error correction section 92 performs error correction on the packet data 95 demodulated in the demodulation section 91. In this error correction, the packet data is finally extracted controlling the coding rate based on information interpreted from the MCS signal 96 in the MCS interpreting section 93.

In this way, interpreting the MCS information contained in the MCS signal 96 by the MCS interpreting section 93 enables adaptive receiving processing in accordance with the receive schedule and the modulation scheme and the like of the packet data 95 received after the MCS signal 96.

Figure 8B:
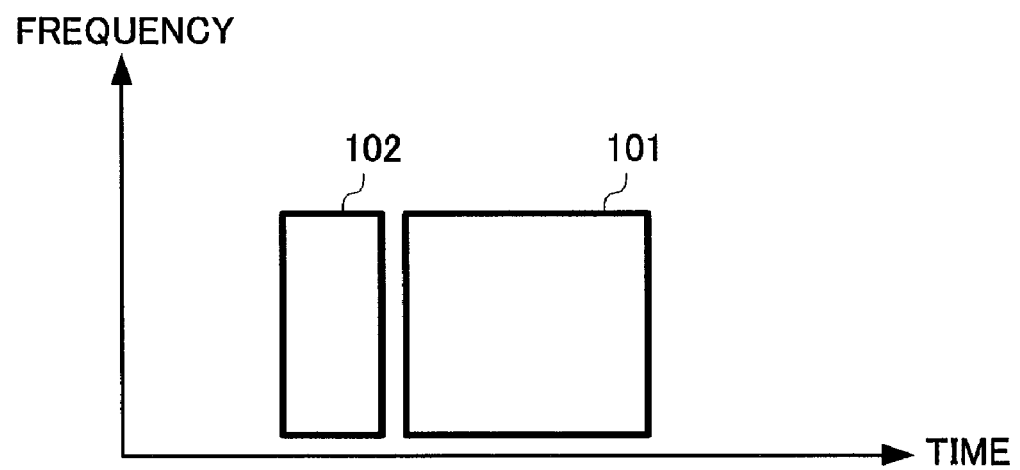
FIG. 8B is a schematic view for explaining an operation of the embodiment 2 of the present invention.

Accordingly, in a usual state, the radio receiving apparatus 80 need only monitor whether or not the MCS signal 96 has been received, in a state where only the MCS signal 96 with a narrowband can be received. Thus, the sampling rate of the analog-digital conversion section 84 can be reduced, and thereby power consumption can be reduced. As can be seen from FIG. 8B showing the case where the bandwidth of an MCS signal 102 transmitted before packet data 101 is equivalent to that of the packet data 101, the sampling rate of the analog digital conversion section of the radio receiving apparatus can be reduced by an amount corresponding to the bandwidth of the MCS signal 102 being wide.

Furthermore, by transmitting the modulation scheme and the coding scheme of the packet data 95 being contained in the MCS signal 96, this information can be notified to the radio receiving apparatus 80 only just before the packet data 96 is transmitted, thus the power consumption of the radio receiving apparatus 80 can be reduced.

Other Embodiments

Figure 10:
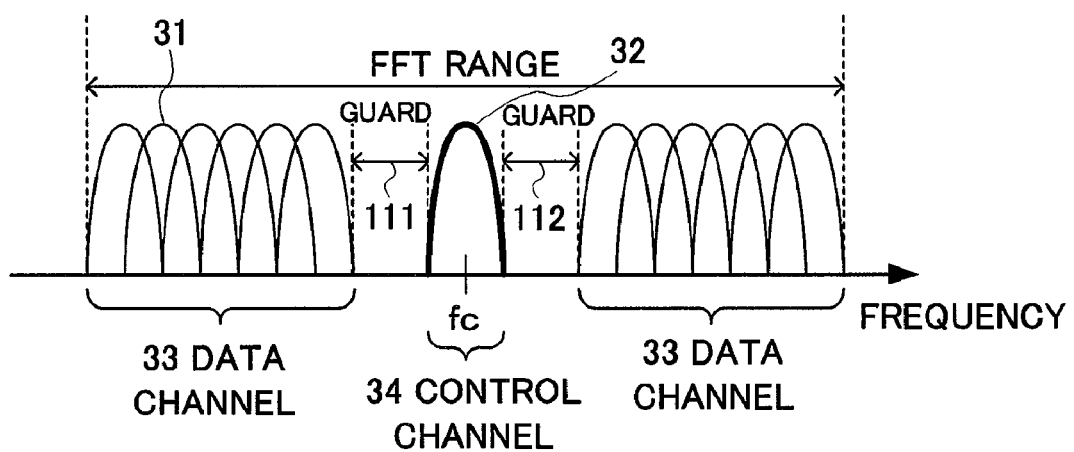
FIG. 10 is a view showing a signal waveform for explaining another embodiment.

The above embodiments have described the case where the data channel 33 and the control channel 34 are located close to each other as shown in FIG. 4, but the present invention is not limited to this. As shown in FIG. 10, guard frequency bands 111 and 112 may be provided between the control channel 34 and the data channel 33 by controlling, for example, the IFFT section 16 (FIG. 3). By this means, the pass bandwidth of the band-pass filter 44 (FIG. 5) can be widened, and the circuit scale of the filter can be reduced.

Figure 11A:
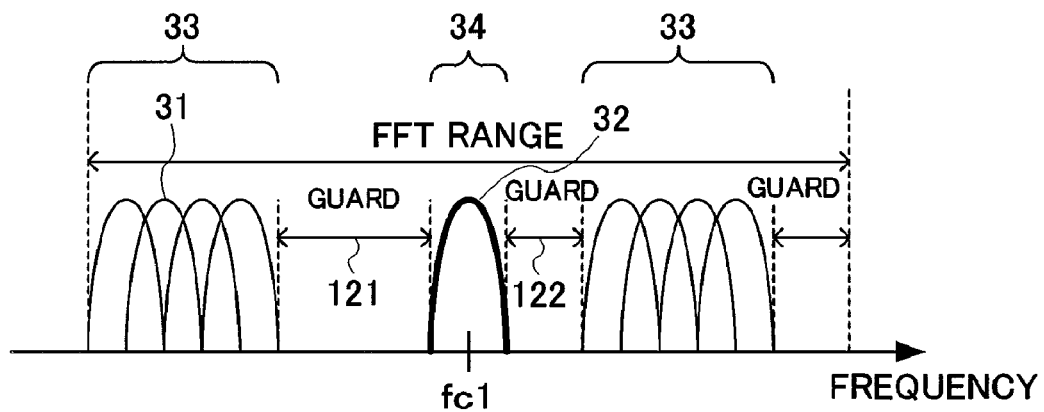
FIG. 11A is a view showing a signal waveform for explaining another embodiment.
Figure 11B:
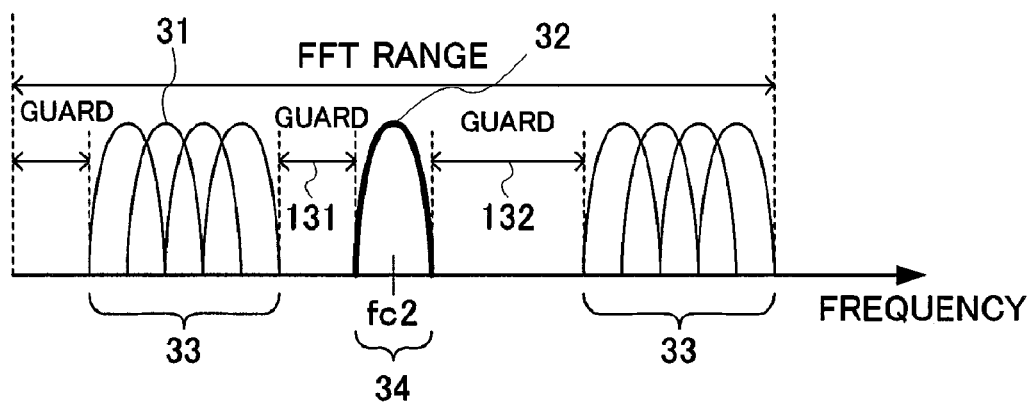
FIG. 11B is a view showing a signal waveform for explaining another embodiment.

Furthermore, the above embodiment has described the case where the guard frequency bands 111 and 112 between the control channel 34 and the data channel 33 are the same in width as shown in FIG. 10, but the present invention is not limited to this. As shown in FIGS. 11A and 11B, guard frequency bands 121 (131) and 122 (132) may be different in width. By this means, in a multicell environment, when a plurality of base stations as radio transmitting apparatuses transmit the control channel 34 and the data channel 33 at the same time, the center frequencies fc of the transmit frequency bands of a plurality of mobile stations as radio receiving apparatuses are shifted on a per cell basis to center frequencies fc1, fc2, and the like and, thus, the control channel 34 is used at different frequencies between the cells (the control channels 34 being configured according to FDMA (Frequency Division Multiple Access)), while local signals of the control channel 34 and the data channel 33 are used at the same frequency.

In the multicell environment, the arrangement of the control channel 34 can be changed adaptively according to the situation of neighboring cells by changing the width of guard frequencies by controlling, for example, the IFFT section 16, and thereby interference to the control channel 34 can be reduced. Here, in the case where the radio transmitting apparatus 10 is a mobile station, the radio transmitting apparatus 10 may measure information about neighboring cells from the received signals and change the width of guard frequencies using the measuring results, so that the guard frequencies can be controlled based on actually measured information.

Figure 12:
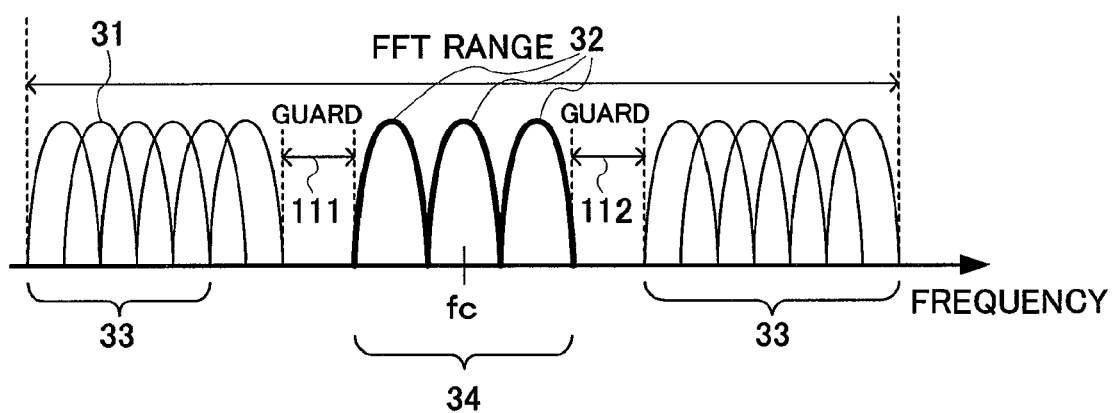
FIG. 12 is a view showing a signal waveform for explaining another embodiment.

Furthermore, the previous embodiments have described the case where only one subcarrier 32 is used as the control channel 34, but the present invention is not limited to this. As shown in FIG. 12, for example, a plurality of subcarriers 32 may be used as the control channel. By this means, each mobile station that is a radio receiving apparatus can extract and receive only a necessary control channel.

Figure 13:
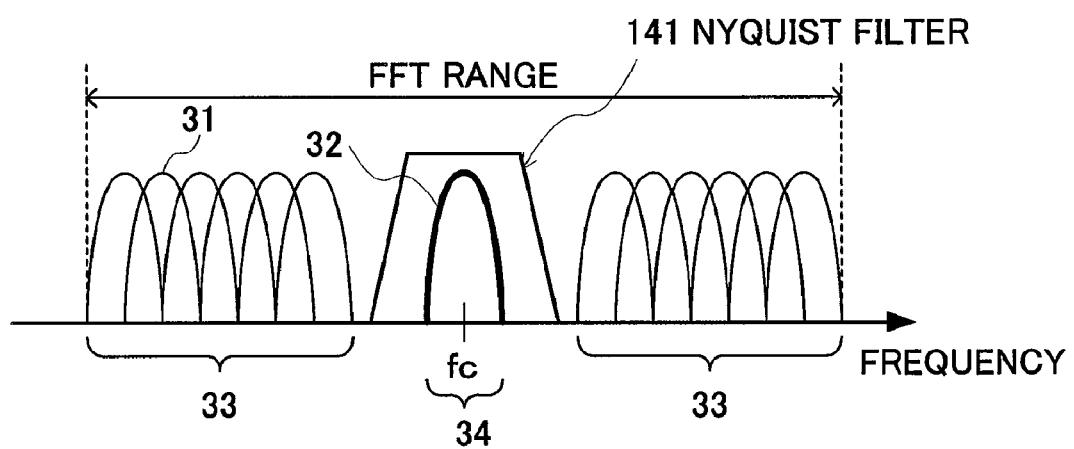
FIG. 13 is a view showing a signal waveform for explaining another embodiment.

Yet further, by performing Nyquist filtering on the control channel 34 by a Nyquist filter 141 and transmitting as shown in FIG. 13, interference in other subcarriers (subcarriers 31 of the data channel) can be minimized, and also on the radio receiving apparatus side, by using a Nyquist filter, it becomes possible to receive at minimized inter code interference, so that the receiving performance can be improved.

Still further, by adopting a paging channel indicating that an incoming call exists as the control channel 34, the sampling rate of the analog-digital conversion section can be reduced on the radio receiving apparatus side when a call is not in progress, the power consumption of the radio receiving apparatus can be reduced.

As described above, according to the present invention, a plurality of subcarriers are assigned to the data channel and fewer subcarriers than the plurality of subcarriers are assigned to the control channel and, in addition, the control channel is located at the center frequency of the frequency band used to transmit the data channel. Thus, on the radio receiving apparatus side, the frequencies of the local signal by which the received signal is multiplied are common, and thereby switching between the control channel and the data channel can be speeded up.

The present description is based on Japanese Patent Application No. 2002 114870, filed on Apr. 17, 2002, the entire disclosure of which is incorporated herein by reference.

While illustrative embodiments have been illustrated and described, it will be appreciated that various changes can be made therein without departing from the spirit and scope of the claimed subject matter.

Figure 1:
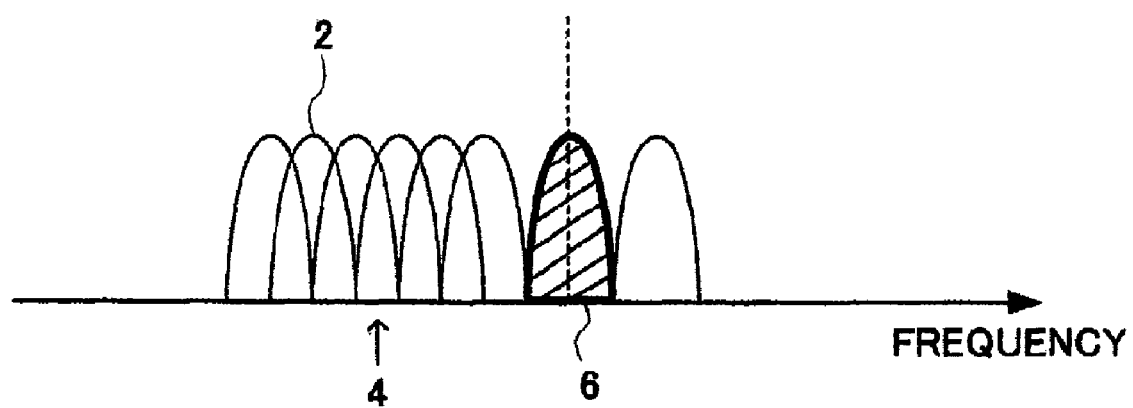
FIG. 1 is a view showing a signal waveform for explaining a conventional operation.
Figure 2:
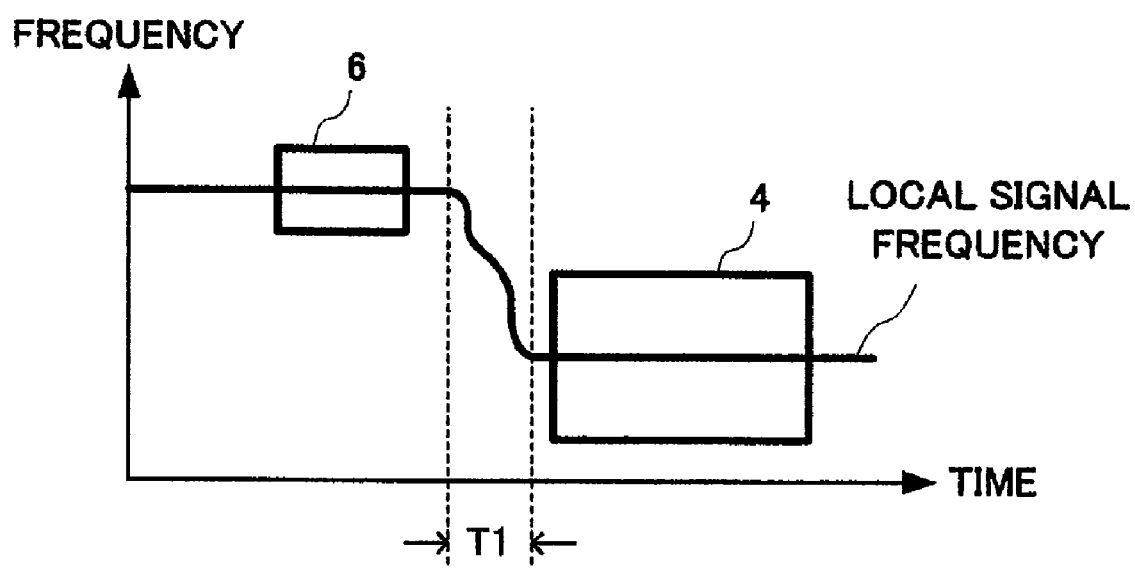
FIG. 2 is a schematic view for explaining the conventional operation.

FIG. 1
FREQUENCY
FIG. 2
FREQUENCY
LOCAL SIGNAL FREQUENCY
TIME
FIG. 3
(CONTROL CHANNEL SIGNAL)
(DATA CHANNEL SIGNAL)
11: SPREAD
12: MODULATION
13: MODULATION
14: MULTIPLEX
17: D/A CONVERSION
(LOCAL)
FIG. 4
FREQUENCY
FFT RANGE
33 DATA CHANNEL
34 CONTROL CHANNEL
FIG. 5
42: AMPLIFY
44: BAND PASS FILTER
45: A/D CONVERSION
(LOCAL)
BANDWIDTH INFORMATION
SAMPLING RATE
46: CHANNEL SELECTING SECTION
50, 51: DEMODULATION
52: DESPREAD
(DATA CHANNEL SIGNAL)
(CONTROL CHANNEL SIGNAL)
FIG. 6
FREQUENCY
33 DATA CHANNEL
34 CONTROL CHANNEL
LOCAL SIGNAL FREQUENCY
TIME
FIG. 7
(MCS INFORMATION)
(DATA CHANNEL SIGNAL)
61: SPREAD

62: CODING
63,64: MODULATION
65: MULTIPLEX
68: D/A CONVERSION
(LOCAL)
FIG. 8A
FREQUENCY
PACKET DATA
TIME
FIG. 8B
FREQUENCY
TIME
FIG. 9
82: AMPLIFY
83: BAND PASS FILTER
84: A/D CONVERSION
(LOCAL)
BANDWIDTH INFORMATION
SAMPLING RATE
85: CHANNEL SELECTING SECTION
88: DEMODULATION
90,91: DESPREAD
92: ERROR CORRECTION
93: MCS INTERPRETING
DEMODULATION SCHEME
CODING RATE
(PACKET DATA)
FIGS. 10 to 12.
FREQUENCY
FFT RANGE
GUARD
33 DATA CHANNEL
34 CONTROL CHANNEL
FIG. 13
FREQUENCY
FFT RANGE
141 NYQUIST FILTER

The invention claimed is:

1. A radio transmitting apparatus comprising:
   (a) an assigning section configured to assign a first plurality of subcarriers of an OFDM multicarrier signal to a data channel, and to assign a second plurality of subcarriers of the OFDM multicarrier signal to a control channel,
   the first plurality of subcarriers being located in two separate parts on a frequency axis, the second plurality of subcarriers being located between the two separate parts, and
   a center frequency of the first plurality of subcarriers being the same as a center frequency of the second plurality of subcarriers;
   (b) an up-conversion section configured to up-convert the OFDM multicarrier signal; and
   (c) a transmitter operable to transmit the up-converted OFDM multicarrier signal,
   wherein the center frequency is different on a per cell basis.

2. The radio transmitting apparatus according to claim 1, wherein:
   the assigning section assigns guard frequencies between the second plurality of subcarriers and the two separate parts, and
   the center frequency is controlled by changing widths of the guard frequencies.

3. The radio transmitting apparatus according to claim 2, wherein the widths of guard frequencies are changed based on information measured from a signal transmitted by a neighboring cell.

4. A base station apparatus equipped with said radio transmitting apparatus according to claim 1.

5. The radio transmitting apparatus according to claim 1, wherein the two separate parts include the same number of subcarriers.

6. A radio transmitting method comprising:
   (a) assigning a first plurality of subcarriers of an OFDM multicarrier signal to a data channel, and to assign a second plurality of subcarriers of the OFDM multicarrier signal to a control channel,
   the first plurality of subcarriers being located in two separate parts on a frequency axis, the second plurality of subcarriers being located between the two separate parts, and
   a center frequency of the first plurality of subcarriers being the same as a center frequency of the second plurality of subcarriers;
   (b) up-converting the OFDM multicarrier signal; and
   (c) transmitting the up-converted OFDM multicarrier signal,
   wherein the center frequency is different on a per cell basis.

7. The radio transmitting method according to claim 6, further comprising assigning guard frequencies between the second plurality of subcarriers and the two separate parts at the assigning, and controlling the center frequency by changing widths of the guard frequencies.

8. The radio transmitting method according to claim 7, further comprising changing the widths of guard frequencies based on information measured from a signal transmitted by a neighboring cell.

9. A radio transmitting apparatus comprising:
   (a) a mapping section configured to map an OFDM multicarrier signal to a first plurality of sub carriers corresponding to a first band and to a second plurality of subcarriers corresponding to a second band, the first plurality of subcarriers assignable to a data channel, the second plurality of subcarriers assignable to a control channel, and a center frequency of the second band being identical to a center frequency of a whole band comprising the first band and the second band;
   (b) an up-conversion section configured to up-convert the OFDM multicarrier signal; and
   (c) a transmitting section configured to transmit the up-converted OFDM multicarrier signal,
   wherein the center frequency is different on a per cell basis.

10. The radio transmitting apparatus according to claim 9, wherein the assigning section assigns guard frequencies between the first band and the second band, and
    the center frequency is controlled by changing widths of the guard frequencies.

11. The radio transmitting apparatus according to claim 10, wherein the widths of guard frequencies are changed based on information measured from a signal transmitted by a neighboring cell.

12. The radio transmitting apparatus according to claim 9, wherein the first band and the second band do not overlap with each other and the whole band consists of the first band and the second band.

13. The radio transmitting apparatus according to claim 9, wherein a center frequency of the first band is identical to the center frequency of the second band and the center frequency of the whole band.

14. The radio transmitting apparatus according to claim 9, wherein the first band is positioned in two separate bands on a frequency axis.

15. The radio transmitting apparatus according to claim 14, wherein the second band is positioned between the two separate bands.

16. The radio transmitting apparatus according to claim 15, wherein the two separate bands include the same number of subcarriers.

17. A base station apparatus equipped with said radio transmitting apparatus according to claim 9.

18. A radio transmitting method comprising:
(a) mapping an OFDM multicarrier signal to a first plurality of subcarriers corresponding to a first band and to a second plurality of subcarriers corresponding to a second band, the first plurality of subcarriers assignable to a data channel, the second plurality of subcarriers assignable to a control channel, and a center frequency of the second band being identical to a center frequency of a whole band comprising the first band and the second band;
(b) up-converting the OFDM multicarrier signal; and
(c) transmitting the up-converted OFDM multicarrier signal,
wherein the center frequency is different on a per cell basis.

19. The radio transmitting method according to claim 18, further comprising assigning guard frequencies between the first band and the second band, and controlling the center frequency by changing widths of the guard frequencies.

20. The radio transmitting method according to claim 19, further comprising changing the widths of guard frequencies based on information measured from a signal transmitted by a neighboring cell.

21. The radio transmitting method according to claim 18, wherein the first band and the second band do not overlap with each other and the whole band consists of the first band and the second band.

22. The radio transmitting method according to claim 18, wherein a center frequency of the first band is identical to the center frequency of the second band and the center frequency of the whole band.

23. The radio transmitting method according to claim 18, wherein the first band is positioned in two separate bands on a frequency axis.

24. The radio transmitting method according to claim 23, wherein the second band is positioned between the two separate bands.

* * * * *